United States Patent [19]

Rigollot

[11] 4,049,299
[45] Sept. 20, 1977

[54] ANTI-POLLUTING POWER PLANT USING COMPRESSORS AND GAS TURBINES

[75] Inventor: Georges Alfred Rigollot, Paris, France

[73] Assignee: Agence Nationale de Valorisation de la Recherche (ANVAR), Neuilly sur Seine, France

[21] Appl. No.: 633,814

[22] Filed: Nov. 20, 1975

Related U.S. Application Data

[63] Continuation-in-part of Ser. No. 450,067, March 11, 1974, abandoned.

[30] Foreign Application Priority Data

Mar. 12, 1973 France .............................. 73.08724

[51] Int. Cl.² .......................................... F01D 15/10
[52] U.S. Cl. ................................. 290/52; 60/39.52; 60/39.18 B
[58] Field of Search ........ 60/39.18 B, 39.15, 39.18 A, 60/39.18 C, 39.18 R, 39.07, 39.23, 39.5, 39.52, 39.55, DIG. 11; 290/52, 4 A, 4 D

[56] References Cited

U.S. PATENT DOCUMENTS

| | | | |
|---|---|---|---|
| 3,585,795 | 6/1971 | Grieb | 60/39.16 |
| 3,631,673 | 1/1972 | Charrier et al. | 60/39.18 B |
| 3,757,517 | 9/1973 | Rigollot | 60/39.18 R |
| 3,786,635 | 1/1974 | Kates et al. | 60/278 |
| 3,849,662 | 11/1974 | Blaskowski et al. | 290/52 |

Primary Examiner—Robert K. Schaefer
Assistant Examiner—Michael K. Mutter

[57] ABSTRACT

An electric power generating plant includes at least two compressors having matched operating characteristics, alternators and turbines and boilers having combustion chambers connected to the turbines. The compressors, alternators and turbines are operatively interconnected such that during no power demand periods the compressors are driven in a series arrangement by the alternators, functioning as electric motors, to store a supply of pressurized air in an air storage tank, and during normal and peak power demand periods the turbines, supplied by the combustion chambers of the boilers, drive the compressors, functioning in parallel relationship, which feed respective ones of the boilers with enriched air and a gas recycled after expansion by one of the turbines. During the normal and peak power demand periods pressurized air previously stored in the air storage tank by the compressors is fed to the combustion chamber of one of the boilers.

13 Claims, 2 Drawing Figures

——————— night storage

ANTI-POLLUTING POWER PLANT USING COMPRESSORS AND GAS TURBINES

The present application is a Continuation-In-Part of parent application Ser. No. 450,067 filed Mar. 11, 1974 now abandoned and claims the effective date thereof for all the commonly disclosed subject matter.

BACKGROUND OF THE INVENTION

The invention relates to electric power generating plants and more particularly to such a plant having interconnected compressors, alternators, turbines and boilers. Energy in the form of pressurized air is stored at times of no power demand and is recovered and used to produce electric power at times of normal and peak power demand.

It has been known heretofore, as disclosed in U.S. Pat. No. 3,757,517 issued Sep. 11, 1973 to Georges Alfred Rigollot, to provide an electric power generating plant in which a combination of compressors, alternators, turbines and boilers are so connected as to store cold air during low power demand periods, under a relatively high pressure, for subsequent use in the turbines at times of high power demand. However, such prior power generating plants as disclosed in this inventor's earlier above stated U.S. patent functioned at relatively high pressures in the boilers and turbines and also required the storage of the refrigerated air at a relatively high pressure. In addition, a fairly large number of compressors, turbines, heat exchangers and alternators were required thereby adding to the initial expense and maintenance costs for the rather complex plant required. It was also characteristic of the prior art power generating plants to discharge substantial quantities of pollutants into the atmosphere and to dissipate significant quantities of heat energy in the stack flow.

SUMMARY OF THE INVENTION

It is one object of the invention to provide an electric power generating plant capable of storing energy during no power demand periods which is recovered for use during normal and peak power demand periods and which utilizes fewer compressors and turbines.

It is another object of the invention to provide an electric power generating plant of the character described which results in decreased environmental pollution.

It is another object of the invention to provide an electric power generating plant which is operable with reduced boiler and turbine pressures thereby enabling a reduction in plant investment and in maintenance costs.

Other objects and advantages of the invention will become readily apparent from the following description of the invention.

According to the present invention there is provided a versatile electric power generating plant operative during normal and peak power demand periods and also during no power demand periods comprising in combination: first and second compressors having matched operating characteristics; means for selectively supplying said first compressor during normal and peak power demand periods with a recycled gas for pressurizing same; means for selectively supplying said second compressor during normal and peak power demand periods with air for pressurizing same; first and second boilers having combustion chambers adapted to be supplied with pressurized recylce gas and air from said first and second compressors, respectively, during normal and peak power demand periods; an air storage tank adapted to be supplied with and to store pressurized air; means for connecting said second compressor in series with said first compressor and said second compressor with said air storage tank for pressurizing said tank with air during no power demand periods; means for supplying pressurized air from said air storage tank to said first combustion chamber during normal and peak power demand periods; first and second turbines adapted to receive respectively the outputs from said first and second combustion chambers; first and second alternators adapted for connection respectively to said first and second turbines for drive thereby during normal and peak power demand periods; at least said first compressor, turbine and alternator being coupled to a common shaft for drive of said first compressor by said first alternator during no power demand periods and for drive of said first compressor and said first alternator by said first turbine during normal and peak power demand periods; and recycle means adapted to receive at least a portion of the output of said first turbine and to supply at least said recycled gas to said first compressor.

BRIEF DESCRIPTION OF THE DRAWINGS

In order that the invention may be more fully comprehended it will now be described, by way of example, with reference to the accompanying drawings in which.

DETAILED DESCRIPTION OF THE INVENTION

Figure 1:
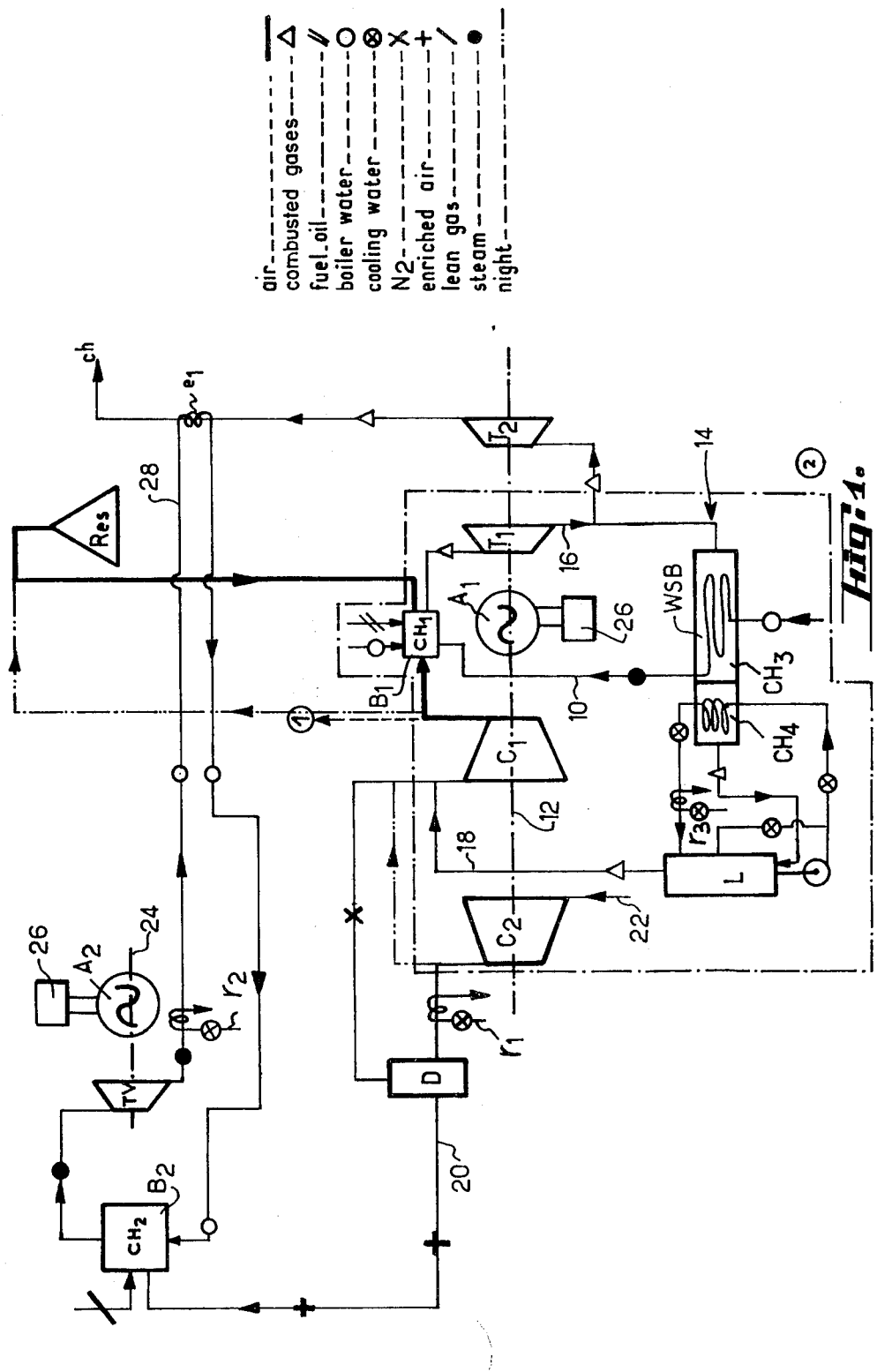
FIG. 1 is a schematic diagram of an electric power generating plant embodying the features of the invention.

Referring to FIG. 1 of the drawings there is shown a pair of compressors $C_1$ and $C_2$ having matched operating characteristics so as to enable compressor $C_1$ to compress a recycle gas for introduction to a first boiler $B_1$ having a combustion chamber $CH_1$ therein and compressor $C_2$ to compress atmospheric air therein while both of such compressors are driven at the same rotational speed. Such compressors should operate at an efficiency of approximately 85% at the rotational speeds contemplated. Fuel such as oil, and air from an air storage tank Res, are fed to combustion chamber $CH_1$ and water is introduced to boiler $B_1$ for flashing into steam in combustion chamber $CH_1$ and fed together with the combusted gases in combustion chamber $CH_1$ to turbine $T_1$ for driving the same, the combusted gases and steam at the outlet of turbine $T_1$ being in part fed to turbine $T_2$ and to recuperating boiler $CH_3$ in the recycle circuit 14 as hereinafter disclosed. Conduit 10 connects the combustion chamber with a waste steam boiler WSB for the introduction of the steam recovered from the boiler subsequent to the heat exchange of the boiler water with expanded hot gases to be recycled from a turbine $T_1$ to compressor $C_1$ under pressure as will be described.

An alternator $A_1$ is mounted on the same shaft 12 as that of compressor $C_1$ and turbine $T_1$. In accordance with the embodiment illustrated in FIG. 1 compressor $C_2$ is also mounted upon shaft 12 although this is not essential as will be appreciated from the embodiment illustrated in FIG. 2. However, since compressors $C_1$ and $C_2$ are intended to rotate at the same speed when mounted upon the common shaft 12 and at substantially the same speed when rotated by their associated alternators under no power demand periods, as will be described hereafter, the aforesaid requirement that the compressors have matched operating characteristics is of importance. Alternator $A_1$, through the interposition of switching means well known to persons in the art and not shown herein, is adapted to serve as a prime mover (electric motor) for compressor $C_1$ during such times as there is no power demand upon the plant and is adapted to be driven by turbine $T_1$ at such times as there is normal or peak power demand upon the plant to thereby generate electricity. A turbine $T_2$ is desirably mounted on shaft 12 and is adapted to receive hot expanded gases from turbine $T_1$ and to discharge such gases after further expansion to the flue or chimney ch. Thus, during normal and peak demand periods the turbine $T_2$ develops additional thrust for delivery to shaft 12 to supplement the thrust developed by Turbine $T_1$. Compressors $C_1$ and $C_2$ and alternator $A_1$ are driven by the turbines during such normal and peak power demand periods.

A recycle circuit identified generally by reference numeral 14 is shown in FIG. 1 as including waste steam boiler WSB, heat recuperator $CH_3$, secondary heat exchanger $CH_4$ and a water scrubber or washer L which is cooled by the circulation of cold water through a water cooler $r_3$. All of such components of the recycle circuit are conventional apparatus and require no detailed description herein. However, it will be observed that a portion of the hot expanded gases from turbine $T_1$ are diverted to the waste steam boiler WSB by means of conduit 16. As previously stated, steam generated in the waste steam boiler WSB is introduced into combustion chamber $CH_1$ to improve the combustion reaction therein. Scrubber L serves to reduce the temperature of expanded already combusted gases derived from turbine $T_1$ for recycle to compressor $C_1$, and permits the condensation of steam. By recycling the cooled gases by means of conduit 18 nitrogen being passed to compressor $C_1$ from fractionator D to be described hereafter, will be brought under low pressure. An advantage of combusting gases in chamber $CH_1$ in the presence of the nitrogen under pressure is the development of a "neutral" gaseous body which tends to reduce to a minimum the extent of corrosion in the combustion chamber and in turbines $T_1$ and $T_2$.

It will be appreciated that the provision of turbine $T_2$ and the recycled circuit thus allows a diminution of the quantity of pollutants normally discharged into the environment simultaneously with the loss of significant amounts of heat energy contained in the expanded gases. The recycled gases are thus repressured within compressor $C_1$ and conveyed to combustion chamber $CH_1$ and thence to the turbines $T_1$ and $T_2$ to perform additional work.

Conduit 1 may be provided, if desired, for the replenishment of an external depleted supply of petroleum or a combustible gas (not shown) by the pressurized "neutral" nitrogen-containing gas discharged from compressor $C_1$. This use of the compressor $C_1$ serves to underscore the versatility of the plant albeit such replenishment does not contribute to the power generating capacity of the plant.

Referring further to FIG. 1 of the drawings there is shown a fractionating unit D interposed in conduit 20 leading from compressor $C_2$ to a second boiler $B_2$ having therein a combustion chamber $CH_2$. Air, such as atmospheric air, at a relatively low pressure is introduced by means of conduit 22 into compressor $C_2$. During normal and peak power demand periods compressor $C_2$ is switched, by means known per se and therefore not described herein, so as to operate in parallel with compressor $C_1$. Thus, whereas compressor $C_1$ during such periods is driven by shaft 12 to deliver pressurized recycled cooled gas and nitrogen to combustion chamber $CH_1$ the compressor $C_2$ delivers air to the fractionator D after first passing in heat exchange relation with a coolant in cooler $r_1$ and then being expanded. In the fractionator, which may be of the same general type disclosed in U.S. Pat. No. 3,757,517, nitrogen is separated from the air. Enriched air is passed to combustion chamber $CH_2$ together with a lean gas via conduit 20. The combustion chamber $CH_2$ generates steam which is introduced into turbine TV for its operation and for the driving of alternator $A_2$. Desirably the alternator $A_2$ and turbine TV are mounted upon common shaft 24.

A cooling or refrigerating unit $r_2$, which may be of the same type as water cooler $r_3$, is interposed in the path of the hot expanded gases discharged from turbine TV and serves to cool such gases and condense steam therein. The discharge gases are directed in a circuit 28, including heat exchanger $e_1$. The combustion gases are passed to the chimney stack or flue ch, whereas the steam condensed in exchanger $e_1$ is recycled, back to the combustion chamber $CH_2$.

An external electric power source is indicated generally by reference numeral 26. It will be understood that switching means (not shown) operatively connect the power source with alternators $A_1$ and $A_2$ so as to selectively supply electric power to run alternator $A_1$ as an electric motor or to receive electric power produced by such alternators when they function as generators.

The operation of the electric power generating plant described above will now be explained with reference to its two modes of operation, i.e., the no power demand period and the normal and peak power demand period.

NO POWER DEMAND PERIOD

In this mode the electrical power source 26 supplies electric power to alternator $A_1$ which then drives compressor $C_1$ and $C_2$ by means of common shaft 12. Switching means (not shown but of conventional form) disconnect turbines $T_1$ and $T_2$ from their operational relationship with shaft 12 and thereby with compressors $C_1$ and $C_2$. Compressor $C_2$ pressurizes air introduced thereinto and functions effectively in series with compressor $C_1$ by delivering the pressurized air to such compressor where it is compressed to a higher pressure and delivered to air storage tank Res for storage therein.

NORMAL AND PEAK DEMAND PERIODS

In this mode the switching means referred to above connect turbines $T_1$ and $T_2$ to shaft 12 and to compressors $C_1$ and $C_2$. Switching means, also referred to above, reverse the connection between alternators $A_1$ and $A_2$ and electric power source 26 so as to permit the transmission of electric power generated by the alternators (now functioning as generators) to the grid. The turbines $T_1$ and $T_2$ are fed a working fluid by combustion chamber $CH_1$ and turbine TV is fed its working fluid by combustion chamber $CH_2$. Alternator $A_1$ is driven by turbines $T_1$ and $T_2$ so as to produce electric power and compressors $C_1$ and $C_2$ are simultaneously driven to respectively deliver pressurized recycle gas to combustion chamber $CH_1$ and pressurized air to the fractionator D for the feeding of enriched air to chamber $CH_2$ and nitrogen to compressor $C_1$. The expanded gases which are discharged from turbine $T_1$ are directed in part to turbine $T_2$ and the remainder to recycle circuit 14 for processing as hereinbefore described.

Figure 2:
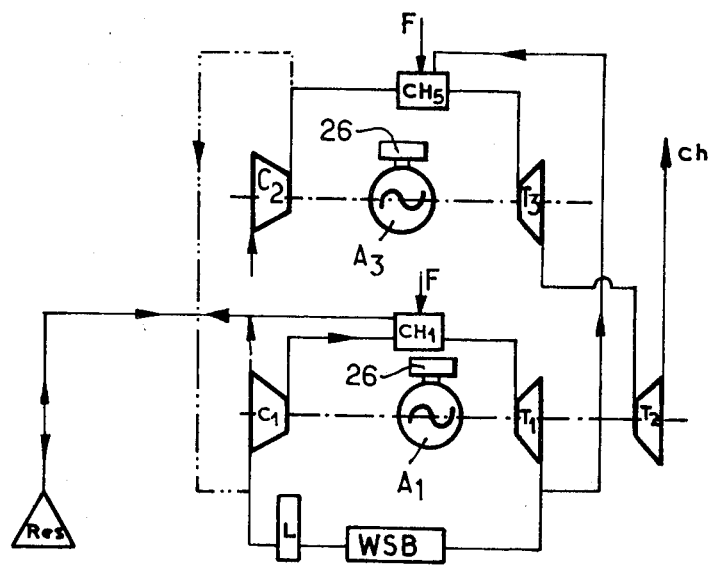
FIG. 2 is a simplified schematic diagram of the plant shown in FIG. 1 depicting an alternate arrangement for one of the compressors and its associated boiler and turbine.

In the embodiment illustrated in FIG. 2 boiler $B_2$ with its combustion chamber $CH_2$, steam turbine TV and alternator $A_2$ (depicted in FIG. 1) are replaced with combustion chamber $CH_5$, turbine $T_3$ and alternator $A_3$. The compressor $C_2$ is thus operatively connected with combustion chamber $CH_5$, turbine $T_3$ and alternator $A_3$ in substantially the same manner as the operative interrelationship between compressor $C_1$, and turbine $T_1$ and alternator $A_1$. It will be seen that in accordance with this embodiment the expanded hot gases from turbine $T_3$ are passed to turbine $T_2$ during the normal and peak power demand periods for discharge through the chimney stack or flue ch. Further, whereas turbine $T_2$ was run by a portion of the gases discharged by turbine $T_1$, such gases are recirculated or recycled into combustion chamber $CH_5$. The remaining portion of the expanded gases from turbine $T_1$ are, as in the embodiment of FIG. 1, recycled by means of the recycle circuit 14 which has not been fully reproduced in FIG. 2 and is represented simply by waste steam boiler WSB and scrubber L.

In accordance with the embodiment of FIG. 2 during night time no power demand hours compressors $C_1$ and $C_2$ are driven so as to operate in series and feed pressurized air to air storage tank Res. During normal and peak demand hours the alternators $A_1$ and $A_3$ compressors $C_1$ and $C_2$ will be driven by turbines $T_1$ and $T_3$. During the pressuring of air storage tank Res it will be understood that when a predetermined pressure has been developed within the tank the compressor $C_1$ can be operatively disconnected therefrom.

It will be appreciated that one of the significant advantages of the present invention derives from operation of the compressors $C_1$ and $C_2$ at relatively low pressures. Due to the lower pressure conditions under which the combustion chambers $CH_1$, $CH_2$ and $CH_5$ operate they can be constructed more simply and economically and do not necessitate as frequent repair as prior boilers and chambers which operated at higher pressures as was previously customary. The gases generated within the combustion chambers are also developed at relatively low pressures and temperatures so that the turbines may also be constructed in a manner which lends itself to economy in manufacture.

What is claimed is:

1. A versatile electric power generating plant operative during normal and peak power demand periods and also during no power demand periods comprising in combination: first and second continuously operating compressors having matched operating characteristics; supply means for selectively supplying said first compressor during normal and peak power demand periods with recycled combusted gases for pressurizing same; means for selectively supplying said second compressor also during normal and peak power demand periods with air for pressurizing same; first and second boilers having first and second combustion chambers, respectively, supplied with pressurized recycle combusted gases and air from said first and second compressors, respectively, during normal and peak power demand periods; an air storage tank supplied with pressurized air to store the same, means for connecting said second compressor in series with said first compressor and said first compressor with said air storage tank for pressurizing said tank with air during no power demand periods; means for supplying pressurized air from said air storage tank to said first combustion chamber during normal and peak power demand periods; first and second turbines respectively connected to the outputs from said first and second combustion chambers; first and second alternators respectively connected to said first and second turbines for drive thereby during normal and peak power demand periods, at least said first compressor, turbine and alternator being coupled to a common shaft for drive of said first compressor by said first alternator during no power demand periods and for drive of said first compressor and said first alternator by said first turbine during normal and peak power demand periods; and recycle means for receiving at least a portion of the output of said first turbine for supply of a part of said recycled gas by said supply means to said first compressor.

2. A power generating plant according to claim 1, wherein said second compressor is coupled to the same shaft as said first compressor.

3. A power generating plant according to claim 2, wherein a distillation unit is connected between said second compressor and said second combustion chamber, said distillation unit being adapted to supply enriched air to said second combustion chamber and nitrogen to said first compressor.

4. A power generating plant according to claim 1, wherein said second turbine and alternator are coupled to a common shaft different from the shaft to which said first compressor, said first turbine and said first alternator are connected.

5. A power generator according to claim 4, wherein said second boiler is a steam boiler adapted to generate steam in its combustion chamber for supply to said second turbine and for thereby driving said second alternator during normal and peak power demand periods.

6. A power generating plant according to claim 1, wherein a third turbine is provided and is connected to said first turbine so as to receive therefrom a portion of the output thereof, the remainder of said output being supplied to said recycle means.

7. A power generating plant according to claim 6, wherein said third turbine is coupled to the same shaft as that to which said first turbine is coupled.

8. A power generating plant according to claim 4, wherein a third turbine is provided and is connected to said second turbine so as to receive gases therefrom and to expand said gases and then discharge same through a chimney stack.

9. A power generating plant according to claim 1, wherein said recycle means comprises a waste steam boiler adapted to receive said portion of the output from said first turbine, a heat exchanger and a liquid cooled scrubber operatively connected to said heat exchanger for cooling the gases therein and for supplying the thus cooled gases to said first compressor.

10. A power generating plant according to claim 9, wherein steam generated in said waste boiler is supplied to said first combustion chamber.

11. A power generating plant according to claim 10, including means for supplying said first boiler with fuel, with steam from said waste boiler and with said recycled gas, means for supplying said second boiler, in addition to said air compressed in said second compressor, with fuel for generating steam therein for the driving of said second turbine and thereby said second alternator.

12. A power generating plant according to claim 4, wherein said second compressor is coupled to the same shaft as said second alternator and said second turbine.

13. A power generating plant according to claim 1, wherein said first and second alternators are connected in parallel to an external electric power source and are adapted to receive electric power therefrom for the driving of the respective compressors associated therewith during no power demand periods and to supply power to said power source during normal and peak power demand periods.

* * * * *